(12) United States Patent
Ohgane

(10) Patent No.: US 8,449,284 B2
(45) Date of Patent: May 28, 2013

(54) OPTICAL ELEMENT MOLDING DIE AND METHOD FOR MOLDING OPTICAL ELEMENT

(75) Inventor: Masanobu Ohgane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 12/613,750

(22) Filed: Nov. 6, 2009

(65) Prior Publication Data

US 2010/0119782 A1    May 13, 2010

(30) Foreign Application Priority Data

Nov. 7, 2008 (JP) ................................. 2008-286552
Oct. 29, 2009 (JP) ................................. 2009-249094

(51) Int. Cl.
*G02B 1/00* (2006.01)
*B28B 7/36* (2006.01)
*B32B 3/00* (2006.01)

(52) U.S. Cl.
USPC ........ 425/385; 249/114.1; 249/115; 249/116; 427/133; 427/135; 65/374.1

(58) Field of Classification Search
USPC ........ 425/385, 470; 249/114.1–116; 427/133, 427/135; 264/219, 2.5; 65/374.1, 374.11, 65/374.12
See application file for complete search history.

(56) References Cited

U.S. PATENT DOCUMENTS

| | | | | | |
|---|---|---|---|---|---|
| 3,259,558 | A | * | 7/1966 | Hagiwara et al. | 205/149 |
| 6,395,343 | B1 | * | 5/2002 | Strangman | 427/454 |
| 7,100,263 | B2 | * | 9/2006 | Imada et al. | 29/514 |
| 7,268,948 | B2 | | 9/2007 | Matsuo | |
| 7,713,768 | B2 | * | 5/2010 | Masuda et al. | 438/29 |
| 8,084,082 | B2 | * | 12/2011 | Nakayama et al. | 427/162 |
| 2004/0163441 | A1 | * | 8/2004 | Sawitowski | 72/462 |
| 2005/0003238 | A1 | * | 1/2005 | Leverenz et al. | 428/698 |
| 2005/0062033 | A1 | * | 3/2005 | Ichihara et al. | 257/17 |
| 2006/0115662 | A1 | * | 6/2006 | Ruppi | 428/469 |
| 2006/0158972 | A1 | * | 7/2006 | Kimura | 369/44.23 |
| 2007/0235342 | A1 | * | 10/2007 | Matsuo et al. | 205/175 |
| 2009/0034122 | A1 | * | 2/2009 | Ichihara et al. | 360/131 |
| 2011/0117274 | A1 | * | 5/2011 | Zhang et al. | 427/162 |
| 2011/0123777 | A1 | * | 5/2011 | Imaoku et al. | 428/172 |

FOREIGN PATENT DOCUMENTS

TW    200300499 A    6/2003
TW    200821135 A    5/2008

* cited by examiner

*Primary Examiner* — Dimple Bodawala
(74) *Attorney, Agent, or Firm* — Canon U.S.A., Inc., IP Division

(57) ABSTRACT

An optical element molding die is designed for molding an optical element having a concave-convex structure. The optical element can be manufactured by a wet system that enables element formation over a large area and a curved surface, without using a lithographic process, and is advantageous in terms of mass production and equipment cost. The optical element molding die includes a substrate having a surface with a negative standard electrode potential in the oxidation reaction and an anodic oxidation layer provided on the substrate. A protective layer with the positive standard electrode potential is provided between the substrate and the anodic oxidation layer.

3 Claims, 2 Drawing Sheets

OPTICAL ELEMENT MOLDING DIE AND METHOD FOR MOLDING OPTICAL ELEMENT

BACKGROUND OF THE INVENTION

1. Field of the Invention

The invention relates to an optical element molding die for molding an optical element having a concave-convex structure and to the optical element.

2. Description of the Related Art

Optical films with different refractive indexes, such as antireflective films, have been provided individually or in a plurality thereof to a thickness of from several tens to several hundreds of nanometers on the surface of optical elements, thereby making it possible to obtain the desired optical properties. Vacuum film formation methods such as vacuum deposition and sputtering or wet film formation methods such as dip coating and spin coating are used to form these optical films on the surface of optical elements.

Optical elements called SWS (Sub-Wavelength Structure) that have a microperiodic structure have been actively studied in recent years as optical elements having the desired optical properties. Antireflection function is known as a specific feature of optical elements having a microperiodic structure. The antireflective function is realized by providing a periodic structure with a period less than an incident wavelength on a substrate. In recent years, the advancements in microprocessing technology made it possible to form extremely fine and complex patterns.

For example, such patterns are fabricated in a semiconductor process centered on photoluminescence. In this method, a photoresist is coated on a substrate that is used to form a concave-convex structure, exposure and development are conducted via the photomask, a resist mask pattern is obtained, and the mask pattern is transferred by etching onto the substrate for forming the concave-convex structure. Further, a large number of researches have also been conducted to attempt the realization of a concave-convex structure on the base of a naturally formed regular structure, that is, a structure that is formed in a self-regulated manner. For example, a method in which an optical element having a concave-convex structure is manufactured at a low cost by arranging microparticles has been suggested.

An anodic oxidation method is also known as a method by which a concave-convex structure can be formed over a large area at a low cost, and the aspect ratio can be randomly controlled. With this method, microholes are formed by using a metal such as aluminum as an anode in an oxidizing electrolytic solution, passing an electric current therethrough, and causing oxidation. A procedure using this method to arrange regularly the holes side by side has been developed. For example, a method has been developed for producing an optical element molding die by forming an Al film by sputtering on a die having a predetermined shape and then forming holes by anodic oxidation and obtaining a concave-convex structure, as described in U.S. Pat. No. 7,268,948. This process is effective for providing a concave-convex structure, while maintaining a highly accurate surface shape of a lens or the like.

A method for manufacturing an optical element molding die by using the conventional anodic oxidation method is a manufacturing method that effectively makes it possible to form a concave-convex structure over a large surface at a low cost and control randomly the aspect ratio. In particular, as described in U.S. Pat. No. 7,268,948, a method is effective in which an optical element molding die is fabricated by forming an Al film by sputtering on a die a predetermined shape and then forming a concave-convex structure by anodic oxidation. For the dies that are used for high-precision molding of lenses or the like, a Ni processed layer has been used most often due to good processability and stability in molding, and a concave-convex structure produced by anodic oxidation can be formed on the surface, while maintaining the surface accuracy of the die, by forming an Al film on the processed Ni surface and conducting anodic oxidation. However, dust that is generated during processing or dust from the atmosphere adheres to the processed Ni layer. The amount of this dust can be reduced by cleaning after processing, but the dust is difficult to remove completely. As a result, the Al film is formed on the Ni layer on which the adhered dust is present. Ni has a negative standard electrode potential in the oxidation reaction, and when anodic oxidation is conducted, nickel is subjected to anodic electrolysis in the electrolytic solution. The dust that has adhered to the Ni layer is also electrolyzed.

Where the dust is dissolved by the electrolysis or oxygen is generated, the oxidation state of Al differs from the usual oxidation state. As a result, the desired microshape cannot be obtained. Another defect is that external appearance changes locally due to variation in color tone caused by the concave-convex structure in this portion. Further, anodic oxidation of Al proceeds by oxidation of Al in the dissolution process, but where the dust is present, dissolution also proceeds from the Al side surface of the boundary portion of the dust and Al. As a result, the electrolytic solution reaches the Ni layer, causing dissolution and generation of gas. As a result, the dust falls off, pinholes are produced, and the desired microshape is difficult to produce. Further, because the Ni layer is subjected to anodic electrlysis, swelling is caused by generation of oxygen or spots are produced by dissolution of the Ni layer and problems are associated with durability of the die.

SUMMARY OF THE INVENTION

The invention has been created with the foregoing in view. An aspect of the invention provides an optical element molding die that excels in durability and has a concave-convex structure formed to a high accuracy and also provides a method for manufacturing an optical element molding die. Another aspect of the invention provides an optical element that has a function of inhibiting an interface reflection light amount at the light incoming-outgoing surfaces and a method for molding the optical element.

In order to attain the above-described aspects, the optical element molding die in accordance with aspects of the invention includes a substrate having at least a surface composed of a material with a negative standard electrode potential, an anodic oxidation layer provided on the substrate, and a protective layer composed of a material with the positive standard electrode potential between the substrate and the anodic oxidation layer.

The method for manufacturing an optical element molding die in accordance with aspects of the invention includes the steps of forming a protective layer comprising a material with a positive standard electrode potential on a substrate that has at least a surface composed of a material with the negative standard electrode potential; forming an aluminum layer on the protective layer; and forming a plurality of holes in the aluminum layer and forming an anodic oxidation layer by conducting anodic oxidation of the aluminum layer by using an electrolytic solution including at least any of phosphoric acid, oxalic acid, and sulfuric acid.

In accordance with aspects of the invention, the optical element molding die that is formed by anodic oxidation using a substrate with a negative standard electrode potential in the oxidation reaction makes it possible to form the desired concave-convex structure of a large area on the optical element even on a curved surface, thereby enabling mass production and reduction of equipment cost.

Further features of the invention will become apparent from the following description of exemplary embodiments with reference to the attached drawings.

DESCRIPTION OF THE EMBODIMENTS

The embodiments of the invention will be described below in greater detail with reference to the appended drawings.

First Embodiment

The first embodiment of the mold for optical element molding in accordance with the invention will be described with reference to FIG. 1.

Figure 1:
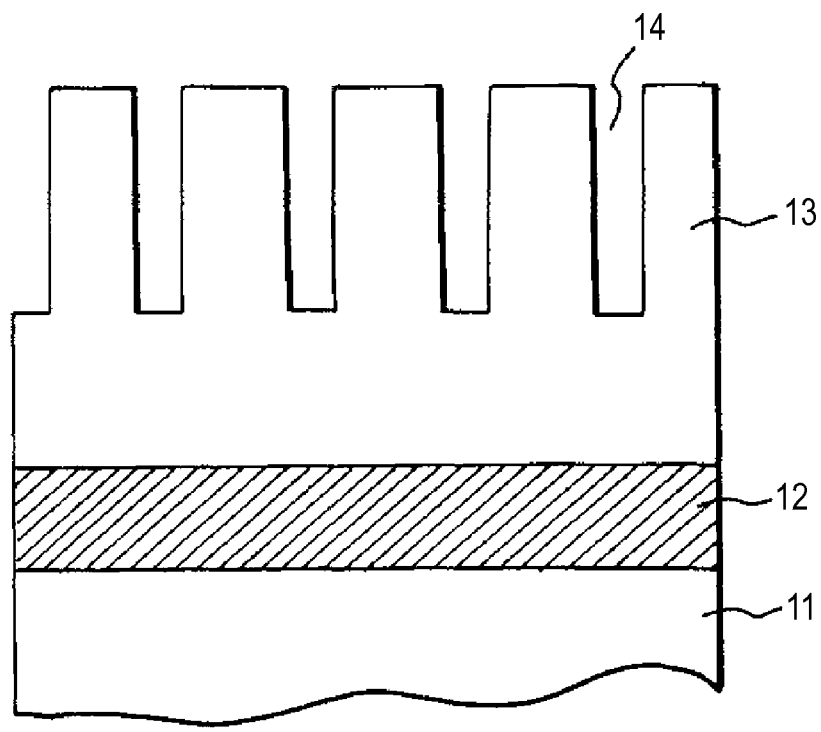
FIG. 1 is a schematic diagram illustrating the first embodiment of the optical element molding die in accordance with aspects of the invention.

FIG. 1 illustrates schematically a cross section of the first embodiment of the optical element molding die in accordance with aspects of the invention.

In FIG. 1, the reference numeral 11 stands for a substrate having a t least a surface composed of a material with a negative standard electrode potential, 12—a protective layer formed on the substrate 11, and 13—an anodic oxidation layer provided on the protective layer 12. A large number of holes 14 are formed by conducting anodic oxidation in the anodic oxidation layer 13. The holes are opened in the direction perpendicular to the surface of the anodic oxidation layer. In FIG. 1, the substrate 11 has a flat shape, but such a shape is not limiting, and the substrate may also have a curved shape. The shape of the entire optical element molding die is not particularly limited and may be similar to the die shape that is generally used. For example, a die of a desired shape such as a round shape, an angular shape, and a shape combining these shapes can be also used. The constituent components will be described below in greater detail.

Substrate

The substrate 11 used in the present embodiment includes Ni at least at the substrate surface to improve processability and stability in molding. A stainless steel including Fe, Cr, Mo, and the like together with Ni, or a superhard alloy using Co as a binder can be also used. These materials have a negative standard electrode potential in the oxidation reaction. The "standard electrode potential", as referred to herein, means a value represented by $\Delta V$ in the reaction defined by the following Equation (1).

$$M^{n+} + ne^- \rightarrow M + \Delta V \qquad (1)$$

Here, $M^{n+}$ is a metal ion, M is a metal atom, n is integer equal to or greater than 1, $e^-$ is an electron, and $\Delta V$ is a standard electrode potential (V).

In the optical element molding die in accordance with the present embodiment, the entire die is immersed in an electrolytic solution and electrolytic treatment is conducted in order to conduct anodic oxidation treatment of the anodic oxidation layer. In a case where the substrate has a negative standard electrode potential, anodic electrolysis in the electrolytic solution proceeds not only at the anodic oxidation layer, but also at the substrate itself, and a reversed reaction of Equation (1) proceeds. As a result, the metal is eluted as metal ions in the electrolytic solution. Dust present on the surface of the substrate 11 is difficult to remove entirely. Anodic oxidation of Al proceeds by ionization of Al and oxidation thereof accompanied by dissolution, but when dust is present, dissolution also proceeds from the Al side surface of the boundary of the dust and Al. As a result, where such dust has adhered to the substrate 11, the electrolytic solution penetrates to the substrate 11 through the anodic oxidation layer 13 and therefore the substrate 11 undergoes anodic electrolysis. The resultant defects include swelling caused by generation of oxygen and spots caused by dissolution of the substrate 11. In the present embodiment, the aforementioned problems are resolved by providing the below-described protective layer 12 between the substrate 11 and the anodic oxidation layer 13.

Protective Layer

The protective layer 12 used in the present embodiment includes a material with a positive standard electrode potential. In the material with a positive standard electrode potential, a reverse reaction of Equation 1 hardly occurs in the electrolytic solution during electrolytic treatment. Therefore, the protective layer 12 is less likely to elute in the electrolytic solution. This is because, when a voltage is increased as in the case of anodic oxidation, dissolution of electrolytic components contained in water or a conversion liquid occurs before the reverse reaction of Equation (1), thereby preventing dissolution and functioning as a protective layer.

A material with a positive standard electrode potential can be selected from the group consisting of Ir, Au, Pt, Ru, Pd, Rh, Re, Ag, Ti, and Cu. An alloy composed of these metal elements may be also used. It is preferred that the protective layer 12 include at least one metal element selected from the aforementioned materials.

A layer that has a standard electrode potential higher than that of the electrolytic solution, but is not from a metal may be also used. Examples of such suitable materials include $SiO_2$, $TiO_2$, $Al_2O_3$, SiN, TiN, and organic polymers.

Among the above-described materials, Au, Cu, Pt, $SiO_2$, and TiN are preferably used from the standpoint of durability and easiness of film formation when used as a die.

Anodic Oxidation Layer

The anodic oxidation layer of the present embodiment includes aluminum and has a plurality of holes opened in the direction perpendicular to the surface of the anodic oxidation layer. These holes are formed during anodic oxidation of the aluminum.

The anodic oxidation as referred to herein means the following technique. Thus, aluminum is immersed as a positive electrode into an electrolytic solution composed of sulfuric acid, oxalic acid, or phosphoric acid. The aluminum is oxidized by connecting a direct current power source between the positive electrode and a negative electrode that is also immersed in the electrolytic solution and passing an electric current between the electrodes, and holes of a submicron order are formed anisotropically in the direction perpendicular to the surface of the anodic oxidation layer. The aluminum anodic oxidation layer is thus formed.

It is known that the pitch and depth of the holes can be controlled by appropriately selecting conditions such as voltage, temperature, and concentration. The pitch of the holes is the distance between the center of a hole to the center of an adjacent hole. The hole depth is the distance from the surface of the anodic oxidation layer to the bottom portion of the hole. By appropriately selecting the conditions of the anodic oxidation process, it is possible to form a porous alumina layer having holes over the entire surface of the Al layer formed on the substrate, thereby forming a concave-convex structure rapidly and inexpensively.

In anodic oxidation, it is preferred that sulfuric acid solution be used at a low voltage (equal to and lower than about 30 V), phosphoric acid solution—at a high voltage (equal to or higher than 60 V), and oxalic acid solution—at an intermediate voltage. Further, the holes formed by anodic oxidation are known to have a structure with a periodic arrangement of about 2.5 times the voltage. Therefore, the period may be adjusted by using different solutions. The hole depth is proportional to the voltage application time under various voltage and temperature conditions. Therefore, the conditions may be appropriately selected according to the desired fine hole shape. However, the hole diameter after anodic oxidation is uniquely determined by the conditions.

A method for manufacturing the above-described optical element molding die of the first embodiment will be described below.

First, a substrate cut to a desired shape and surface accuracy is prepared. As for the substrate material, from the standpoint of processability and stability in molding, it is preferred that Ni be contained in at least the substrate surface. A stainless steel including Fe, Cr, Mo, and the like together with Ni, or a superhard alloy using Co as a binder can be also used. The cutting may be performed directly on the substrate. For example, it is possible to plate a SUS base with Ni—P and then cut the plated layer.

Stains and dust present on the substrate surface are then removed. The stains and dust can be removed by conducting degreasing or electrolytic cleaning.

A protective layer is then formed on the substrate. For example, a gold plating layer is formed by electroplating. The protective layer material is not limited to Au and can be selected from the group consisting of Ir, Pt, Ru, Pd, Rh, Re, Ag, Ti, and Cu. Further, alloys composed of these metal elements may be also used. It is preferred that the protective layer include at least one metal element selected from the aforementioned materials. A layer that has a standard electrode potential higher than that of the electrolytic solution, but is not from a metal may be also used. Examples of such suitable materials include $SiO_2$, $TiO_2$, $Al_2O_3$, SiN, TiN, and organic polymers. As a method for forming the protective layer with these materials, a method suitable for these materials may be optionally selected from a plating method, a dip coating method, a spin coating method which are a wet method; and a vacuum deposition method and a sputtering method which are a dry method. In view of durability of using as the die and easiness of film formation among the above materials, a material selected from at least one of Au, Cu, Pt, $SiO_2$ and TiN may be used as the protective layer material.

Then, for example, Ti is provided as a bonding layer by sputtering on the protective layer and an aluminum layer is formed thereupon, thereby making it possible to obtain a die covered with aluminum. A positive electrode is then attached to part of the surface other than that where a concave-convex structure will be formed, the substrate is covered with a masking tape so as to expose only the surface where the concave-convex structure will be formed, and the other surface is insulated and waterproofed by this cover. The die is then immersed together with the negative electrode, for example, in a 5 wt. % aqueous solution of phosphoric acid adjusted to a temperature of 10° C. Holes can thereafter be opened in the direction perpendicular to the surface of the anodic oxidation layer by applying a voltage of 120 V and passing an electric current till the current amount becomes sufficiently small. A optical element molding die can thus be obtained that has formed thereon the desired fine structure that is free from swelling and spots at the surface of the anodic oxidation layer.

Second Embodiment

The second embodiment of the optical element molding die in accordance with aspects of the invention will be described below.

In the present embodiment, the diameter of a plurality of holes formed during anodic oxidation of aluminum is enlarged by etching in the anodic oxidation layer. The optical element molding die that has the above-described structure will be explained with reference to FIG. 2. The first embodiment and second embodiment have many common features, the explanation of these features will be omitted, and only features that are different from those of the first embodiment will be explained.

Figure 2:
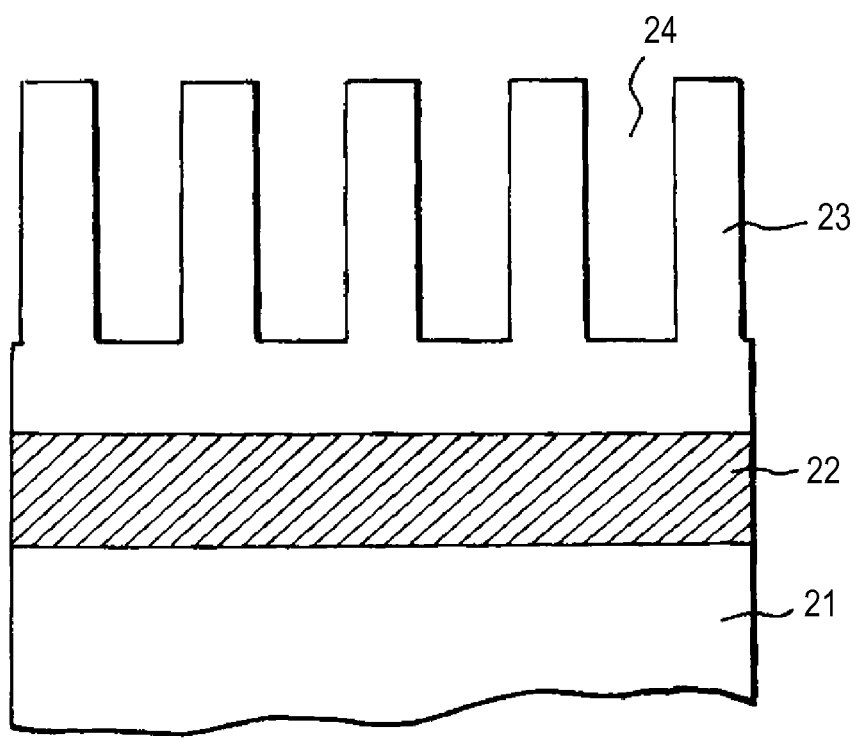
FIG. 2 is a schematic diagram illustrating the second embodiment of the optical element molding die in accordance with the aspects of the invention.

FIG. 2 is an enlarged schematic drawing illustrating the cross-section of a plurality of protrusions at a substrate having the concave-convex structure of the present embodiment. In the present embodiment, similarly to the first embodiment, an anodic oxidation layer 23 is formed on a protective layer 22 that has been provided on a substrate 21. The diameter of a very large number of holes that are formed by anodic oxidation at the anodic oxidation layer 23 is isotropically enlarged by etching.

The diameter of holes obtained by anodic oxidation is isotropically enlarged by etching conducted, for example, by immersion in phosphoric acid or the like. The diameter of holes is proportional to immersion time in phosphoric acid at all temperature conditions and concentration conditions. Therefore, the conditions may be appropriately selected according to the desired fine shape.

A method for manufacturing the optical element molding die according to the second embodiment will be explained below.

A die covered with aluminum is prepared by a method similar to that of the first embodiment. Then, similarly to the first embodiment, a positive electrode is attached to part of the surface other than that where a concave-convex structure will be formed, the substrate is covered with a masking tape so as to expose only the surface where the concave-convex structure will be formed, and the other surface is insulated and waterproofed by this cover. The substrate is then immersed together with the negative electrode, for example, in a 5 wt. % aqueous solution of phosphoric acid adjusted to a temperature of 10° C. An optical element molding die that has formed thereon the desired fine concave-convex structure having holes in the direction perpendicular to the surface can then be obtained by applying a voltage of 120 V and passing an electric current till the current amount becomes sufficiently small. The anodically oxidized die that has thus been obtained is further etched by immersing, for example, in a 5 wt. % aqueous solution of phosphoric acid at room temperature, thereby making it possible to obtain an optical element molding die of the present embodiment that has formed thereon the desired fine concave-convex structure having holes in the direction perpendicular to the surface of the anodic oxidation layer.

Third Embodiment

In the present embodiment, an optical element will be explained that is molded by a molding process using an optical element molding die fabricated by a method similar to that of the second embodiment, this optical element having a plurality of concave-convex structures obtained by transferring the surface of the optical element molding die. By using the optical element molding die that is produced by a method possible to inhibit the occurrence of pinholes. Therefore, the concave-convex structure can be produced according to the designed values at the die, thereby making it possible to obtain an optical element according to the designed values.

Generally, when two substances with different refractive indexes and a pitch shorter than a wavelength are mixed, the refractive index $n_{12}$ in the mixing region can be represented with Equation (2) below by the refractive indexes ($n_1$, $n_2$) of the two substances and volume ($ff_1$, $ff_2$) occupied by each substance per unit volume.

$$n_{12} = ff_1 \times n_1 + ff_2 \times n_2 \qquad (2)$$

When only the two substances are present in the mixing region, $$ff_1 + ff_2 = 1 \qquad (3)$$

In a case where light falls perpendicularly from the substance 1 onto the substance 2, or from the substance 2 onto the substance 1, the highest antireflective effect is obtained when the refractive index $n_{12}$ of the mixing region is

[Formula 1]

$$n_{12} = \sqrt{n_1 \times n_2} \qquad (4)$$

For example, when a hole is filled with air, where the refractive index of the substance constituting the hole wall is denoted by n, the fraction ff per unit volume of the hole at which the highest antireflective effect is obtained is represented by Equation (5) below.

[Formula 2]

$$ff = \frac{n - \sqrt{n}}{n - 1} \qquad (5)$$

In a case where the optical surface where the hole is formed is the outermost surface that is in contact with air and the refractive index of the material constituting the hole wall is 1.56, in order to obtain the highest antireflective effect with respect to the perpendicular incidence, it is especially preferred, as shown by Equation (5), that the volume ratio occupied by holes be about 56%. Further, the optimum value of the volume ratio can be appropriately set not only by the refractive index of the material constituting the hole wall, but also by the light incidence angle and polarization.

Where the distance between the centers of adjacent holes, from among the plurality of holes in the present embodiment, is denoted by and the wavelength used is denoted by $\lambda$, the settings are made to satisfy the following condition:

[Formula 3]

$$p < \frac{\lambda}{(n_1 \sin\theta + n_2)} \qquad (6)$$

The conditional formula (6) establishes the upper limit for the distance between the centers of the adjacent holes. Where the upper limit of conditional formula (6) is exceeded, the resultant distance between the adjacent holes is undesirable because zero-order diffraction light is generated and therefore a uniformly excellent antireflective characteristic is difficult to demonstrate over the entire optical surface. The lower limit is functionally not restricted and may be made as small as possible, provided that volume ratio of the aforementioned hole and air is adequate.

Where the wavelength used is denoted by and the opening ratio is denoted by f, the hole depth in the optical element is set to satisfy the following condition:

$$(n1 \cdot f + n2 \cdot (1-f)) \cdot d = \lambda/4 \qquad (7)$$

In a single-layer antireflective film, it is most effective to set the optical film thickness and so that $$n \cdot d = \lambda/4 \qquad (8)$$

where n is a refractive index of the thin film, d—a geometric film thickness, and μ—a designed reference wavelength. In a case where the refractive index of the mixed region is uniform in the thickness direction, the reflection prevention can be said to be similar to that of the single-layer film.

Here, the opening ratio means an area ratio of holes to the treatment area. The opening ratio can be found by binary image processing in a predetermined image region such as that of electron microscope.

Thus, by enlarging the hole diameter, it is possible to realize a uniform antireflection characteristic over the entire optical surface. With the optical element molding die of the present embodiment, the occurrence of pinholes can be inhibited. Therefore, a concave-convex structure can be produced at the die according to the designed values. As a result, an optical element can be obtained that has a uniform antireflective characteristic over the entire optical surface.

A method for manufacturing the optical element having the above-described concave-convex structure will be described below.

Figure 3:
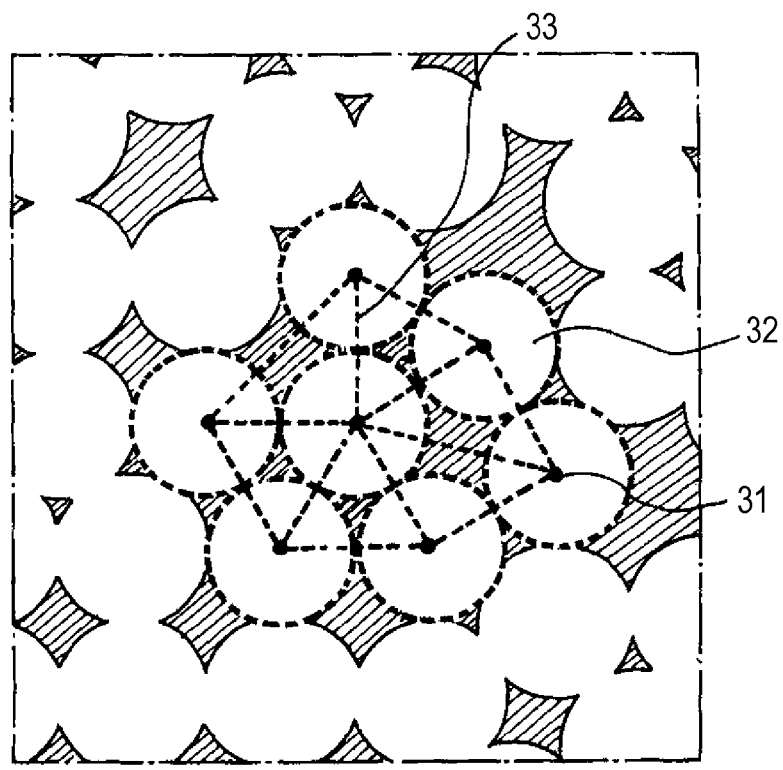
FIG. 3 is a conceptual diagram of an average distance between centers.

The optical element molding die that has been obtained by a method similar to that of the first embodiment is observed under a scanning electron microscope. As shown in FIG. 3, a central coordinate position 31 of a hole is found by image processing, and the average value of a distance 33 between the centers with the closest six holes 32 is found. The die is then immersed in a 5 wt. % aqueous solution of phosphoric acid at normal temperature, the holes are expanded by gradual dissolution till the desired opening ratio is obtained, and the desired fine concave-convex structure is formed.

A spacer is then provided on the die produced in the above-described manner to obtain a predetermined thickness and an ultraviolet curable resin is dropped. A quartz substrate subjected to a coupling processing is slowly brought into contact with the ultraviolet curable resin, press bonded thereto, and spread to prevent the penetration of air bubbles, thereby filling the space between the quartz substrate and the die having the concave-convex structure of the first embodiment. Curing is then conducted by ultraviolet irradiation from the glass plate direction. The cured product is peeled off from the substrate, and an optical element having the concave-convex structure is obtained.

The optical element molded in the above-described manner can be advantageously applied to image pick-up devices such as cameras and video cameras and projection devices such as liquid crystal projectors, displays, and optical scanning devices of electrophotographic apparatuses.

Fourth Embodiment

The fourth embodiment of the optical element molding die in accordance with aspects of the invention will be described below.

The optical element molding die in accordance with the present embodiment has a tapered concave-convex structure. The present embodiment, first embodiment, and second embodiment have many common features, the explanation of these features will be omitted, and only features that are different from those of the first embodiment and second embodiment will be explained.

Figure 4:
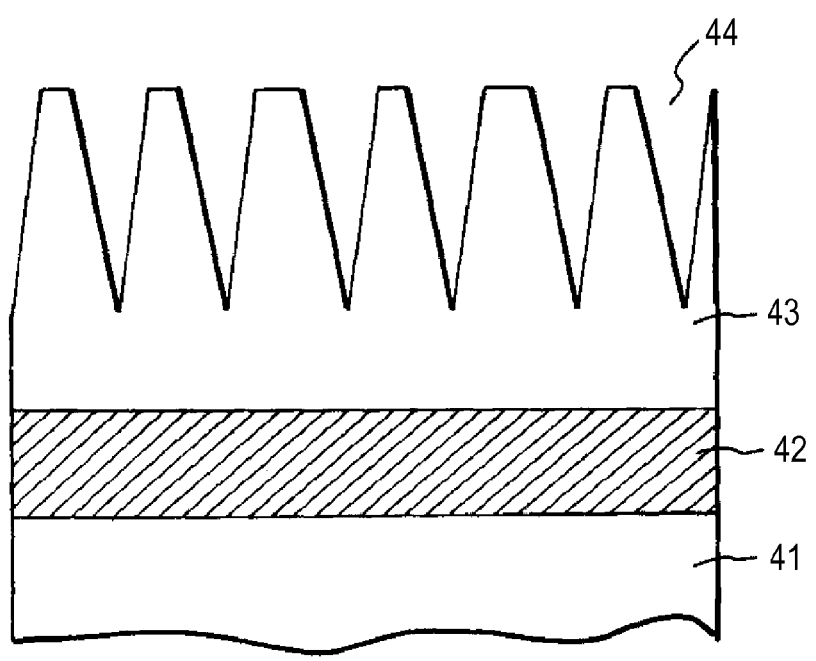
FIG. 4 is a schematic diagram illustrating the fourth embodiment of the optical element molding die in accordance with aspects of the invention.

FIG. 4 is a schematic drawing illustrating an enlarged cross-sectional view of the optical element molding die that has a tapered concave-convex structure of the present embodiment. In the present embodiment, an anodic oxidation layer 43 is formed on a protective layer 42 formed on a substrate 41 in the same manner as in the first and second embodiments. A plurality of tapered holes 44 (concave portions) are provided at the surface of the optical element molding die. The plurality of holes 44 are formed independently from each other in the normal direction to the surface of the optical element molding die. The hole diameter decreases in the depthwise direction (direction toward the bottom of the holes) from the surface of the optical element molding die.

In a case where the size of the concave-convex structure in the transverse direction is less than the light wavelength, the effective refractive index $n_e$ to a certain height can be found by using the following relationship from the Lorentz-Lorenz equation.

[Formula 4]

$$\frac{n_e^2 - 1}{n_e^2 + 2} = f_1 \frac{n_1^2 - 1}{n_1^2 + 2} \quad (9)$$

where $n_1$ stands for a refractive index of the material forming the concave-convex structure and $f_1$ is a space occupation ratio at this height.

Therefore, in a case where the concave-convex structure has a tapered shape and the space occupation ratio of the structure changes gradually from the air (space medium) toward the substrate (incidence medium), the effective refractive index $n_e$ also changes gradually.

In the case where the refractive index changes gradually due to the tapered shape, the reflected light corresponding to the microvariation amount is generated at each height according to the Fresnel equation. Further, the reflected light beams generated at each height interfere, and in a case where the height of the concave-convex structure is equal to or greater than a predetermined value, these lights are canceled by the interference and the reflected light is attenuated. Therefore a configuration of a certain height that has a tapered shape in the form of conical or tapered conical protrusions makes it possible to reduce the reflectance by comparison with that in the case of a columnar shape.

A method in which anodic oxidation and enlargement of hole diameter are repeated in multiple stages can be used to manufacture the above-described die of a tapered shape. First, holes are obtained by conducting anodic oxidation for a given time. Then, the die is immersed into an aqueous solution of phosphoric acid and the hole diameter is enlarged. The die thus obtained and having the enlarged hole diameter is subjected to a second anodic oxidation treatment under conditions identical to those of the initial treatment. As a result, a hole is further formed in the depth direction inside the initially formed hole that has enlarged diameter. Immersion into an aqueous solution of phosphoric acid is then conducted under conditions identical to those of the initial treatment. As a result, the diameter of the hole portion that has been initially formed is further enlarged, and the diameter of the hole obtained in the second anodic oxidation is also enlarged. These operations make it possible to obtain a concave-convex structure provided with concave portions that have a two-stage diameter that decreases in the thickness direction. By repeating the anodic oxidation treatment and immersion into aqueous solution of phosphoric acid in the above-described manner, it is possible to obtain a concave-convex structure having concave portions in the form of tapered holes in which the diameter decreases in multiple steps in the depth direction (direction toward the bottom of the hole). In the explanation above, the conditions of repeated operation are the same for the sake of simplicity, but they may be also different. Furthermore, the anodic oxidation conditions, etching conditions in the aqueous solution of phosphoric acid, and the number of times these operations are repeated may be appropriately selected according to the desired shape of the fine concave-convex structure.

This optical element molding die is used to obtain an optical element having a concave-convex structure with tapered convex portions obtained by transferring the shape of the die onto the element surface. The convex-concave structure shaped at the die may be transferred by molding such as injection, replica, pressing, or pouring, but injection and press molding are especially preferred because they enable efficient molding together with the substrate.

A method for manufacturing the above-described optical element molding die and a method for manufacturing an optical element using the optical element molding die according to the fourth embodiment will be described below.

First, for example, a Ni—P plating layer is formed to a thickness of 100 μm on a SUS base and a substrate cut to the desired shape and surface accuracy is prepared. The substrate is degreased and then stains and dust present on the substrate surface are removed by ultrasonic cleaning. After drying, for example, a $SiO_x$ film is formed as a protective layer. Then, for example, a Ti layer with a thickness of 50 nm is provided as an adhesive layer on the protective layer, while maintaining the vacuum state, and then an aluminum layer is uniformly formed, for example, by deposition on the adhesive layer to obtain a die covered with aluminum. A positive electrode is then attached to part of the surface other than that where a concave-convex structure is wished to be formed, masking is conducted, and an aluminum-covered die is obtained that is insulated and waterproofed by covering the area outside this surface. The die is then immersed together with the negative electrode, for example, in a 5 wt. % aqueous solution of phosphoric acid adjusted to a temperature of 10° C. A voltage of, for example, 120 V is then applied from a direct current power source and a current is passed for 3 min 30 sec. The hole diameter is then expanded by etching, for example, by immersing for 45 min in a 5 wt. % aqueous solution of phosphoric acid at room temperature and dissolving. The voltage application and current passing procedure and the etching procedure are repeated a plurality of times to enlarge the hole diameter and obtain the tapered holes. The optical element molding die that has been produced by the above-described procedure is then used for injection molding a resin or the like with an injection molding apparatus or the like to obtain an optical element having a concave-convex structure.

The optical element manufactured in the above-described manner can be advantageously applied to image pick-up devices such as cameras and video cameras and projection devices such as liquid crystal projectors, displays, and optical scanning devices of electrophotographic apparatuses. The invention will be described below in greater detail by examples thereof. However, the invention is not limited to the examples.

EXAMPLE 1

First, a Ni—P plating layer with a thickness of 100 µm was formed on a SUS base and the surface of the plated layer was cut to prepare a substrate processed to the desired shape and surface accuracy. The substrate had a diameter of 30 mm and a thickness of 10 mm. The substrate was degreased and then stains and dust present on the substrate surface were removed by electrolytic cleaning. A gold plating layer with a thickness of 300 nm was then deposited as a protective layer by electroplating. A protective layer could thus be produced, while inhibiting the adhesion of stains and dust after cleaning, by continuously conducting the series of operations in a wet process.

A Ti layer with a thickness of 50 nm was provided as an adhesive layer by sputtering on the protective layer, an aluminum layer was uniformly formed to a thickness of 300 nm on the titanium layer, and a die covered with aluminum was obtained. A positive electrode was then attached to part of the structure will be formed, the substrate was covered with a masking tape so as to expose only the surface where the concave-convex structure will be formed, and a state was obtained in which the surface outside this surface was insulated and waterproofed. The die was then immersed together with the negative electrode in a 5 wt. % aqueous solution of phosphoric acid adjusted to a temperature of 10° C. A voltage of 120 V was then applied from a direct current power source and a current was passed till the current amount became sufficiently small, thereby obtaining a optical element molding die that had holes perpendicular to the surface. The desired fine concave-convex structure was formed on the surface of the optical element molding die. On the surface of the optical element molding die, generation of swelling and spots due to dissolution of the Ni layer was not observed.

COMPARATIVE EXAMPLE 1

A conventional optical element molding die was then manufactured for comparison. Before a protective layer was formed, a substrate was prepared by a method similar to that of Example 1. The substrate was cleaned and dried by a method similar to that of Example 1, an Al film was then formed on the substrate by a method similar to that of Example 1, and an anodic oxidation layer was formed. Swelling and spots where the Ni layer dissolved appeared on the surface of the obtained optical element molding die (without protective layer).

EXAMPLE 2

A Ni—P plating layer with a thickness of 100 µm was formed on a SUS base and a substrate cut to the desired shape and surface accuracy was prepared. Stains and dust present on the substrate surface were removed and a copper plating layer with a thickness of 300 µm was then deposited as a protective layer by electroplating. A protective layer could thus be produced, while inhibiting the adhesion of stains and dust after cleaning, by continuously conducting the series of operations in a wet process.

A Ti layer with a thickness of 50 nm was provided as an adhesive layer by sputtering on the protective layer, an aluminum layer was uniformly formed to a thickness of 300 nm on the titanium layer, and a die covered with aluminum was obtained. A positive electrode was then attached to part of the surface other than that where a concave-convex structure will be formed, the substrate was covered with a masking tape so as to expose only the surface where the concave-convex structure will be formed, and a state was obtained in which the surface outside this surface was insulated and waterproofed. The die was then immersed together with the negative electrode in a 5 wt. % aqueous solution of phosphoric acid adjusted to a temperature of 10° C. A voltage of 120 V was then applied from a direct current power source and a current was passed till the current amount became sufficiently small. The anodically oxidized die obtained in the above-described manner was etched by immersing for 45 min in a 5 wt. % aqueous solution of phosphoric acid at room temperature, thereby making it possible to obtain an optical element molding die that had the desired fine concave-convex structure having holes in the direction perpendicular to the surface. On the surface of the optical element molding die, generation of swelling and spots due to dissolution of the Ni layer was not observed.

EXAMPLE 3

A Ni—P plating layer with a thickness of 100 µm was formed on a SUS base and a substrate machined to the desired shape and surface accuracy was prepared. The die was degreased and then stains and dust present on the die surface were removed by ultrasonic cleaning. After drying, a $SiO_x$ film with a thickness of 1 µm was formed as a protective layer with a sputtering device. Then, a Ti layer with a thickness of 50 nm was provided as an adhesive layer on the $SiO_x$, and then an aluminum layer was uniformly formed to a thickness of 100 nm by deposition on the adhesive layer to obtain a substrate covered with aluminum. A positive electrode was then attached to part of the surface other than that where a concave-convex structure was wished to be formed, masking was conducted, and an aluminum-covered substrate was obtained that was insulated and waterproofed by covering the area outside this surface. The substrate was then immersed together with the negative electrode in a 5 wt. % aqueous solution of phosphoric acid adjusted to a temperature of 10° C. A voltage of 120 V was then applied from a direct current power source and a current was passed till the current amount became sufficiently small, thereby obtaining a substrate having holes perpendicular to the surface. The substrate thus obtained was observed under a scanning electron microscope and very large number of holes were confirmed to have been formed on the substrate surface. As shown in FIG. 3, a central coordinate position 31 of a hole was found by image processing, and the average value of a distance 33 between the centers with the closest six holes 32 was found. The average value of the distance between the centers of the adjacent holes, that is, a pitch, was about 300 nm. The substrate was then immersed in a 5 wt. % aqueous solution of phosphoric acid at normal temperature, the holes were expanded by gradual dissolution and a substrate having the desired independent protrusions was obtained. The opening ratio in this case was 75%. The desired fine concave-convex structure was formed on the optical element molding die thus obtained. On the surface of the optical element molding die, generation of swelling and spots due to dissolution of the Ni layer was not observed.

A spacer of 50 µm was then provided and an ultraviolet curable resin (RC-0001: manufactured by Dainippon Inks and Chemical Co., Ltd.) was dropped. A glass substrate (BK7) subjected to a coupling processing was slowly brought into contact with the ultraviolet curable resin, press bonded thereto, and spread to prevent the penetration of air bubbles, thereby filling the space between the glass substrate and the die having the concave-convex structure of the first embodiment. Curing was then conducted by irradiation for 750 sec at 40 mW with ultraviolet with a central wavelength of 365 nm from the glass plate direction. The cured product was peeled off from the optical element molding die, and an optical element having the desired fine concave-convex structure was obtained.

COMPARATIVE EXAMPLE 2

A optical element molding die having no fine concave-convex structure which was formed before the protective layer was formed by the method according to Example 3, was formed. An optical element was molded by a method identical to that of Example 3 by using this optical element molding die. A surface-reflectance of the optical element obtained in Comparative Example 2 and Example 3 was measured. Table 1 below shows the results obtained by measuring the reflectance of the optical elements at an incidence angle of 5° by a spectrophotometer. The reflectance of the optical element having a fine concave-convex structure was found to be lower by about 3% than that of the optical element having no fine concave-convex structure. The cross-section of the optical element thus obtained was observed under a scanning electron microscope and a large number of protrusions were confirmed to be present perpendicular to the substrate surface. Also, optical element having a good appearance that no swelling and spots exist could be obtained in Example 3 and Comparative Example 2.

TABLE 1

Results Obtained in Measuring the Reflectance of Optical Elements

|  | 450 nm | 500 nm | 550 nm |
|---|---|---|---|
| Fine structure is present | 1.4% | 1.2% | 1.1% |
| Fine structure is absent | 4.4% | 4.4% | 4.3% |

COMPARATIVE EXAMPLE 3

A conventional optical element molding die was then manufactured for comparison. The substrate formed before the protective layer was formed by the method according to Example 3, was prepared to take as the optical element molding die of Comparative Example 3. The substrate was cleaned and dried by a method similar to that of Example 3, an Al film was then formed on the substrate by a method similar to that of Example 3, an anodic oxidation layer was formed, and the etching was performed to obtain the conventional optical element molding die of Comparative Example 3. On the surface of the conventional optical element molding die (having no protective layer), swelling and spots due to dissolution of the Ni layer were generated.

The optical element was formed by a method identical to that of Example 3 by using this optical element molding die. The reflectance of the conventional optical element of Comparative Example 3 at a portion where swelling and spots were not generated, was found to be lower by about 3% than that of the optical element of Example 2 having no fine concave-convex structure. However, a lowering of the reflectance is not observed at a portion where a swelling and spots-generating part was transferred. As a result, the optical element having unevenness in an appearance was undesirably obtained by difference of the reflectance between the portion and a circumference thereof. The cross-section of the optical element thus obtained was observed under the scanning electron microscope and a large number of protrusions was confirmed to be present perpendicular to the substrate surface at a normal portion. At a swelling portion, holes opened by dissolution of the Ni layer were transferred to form convex protrusions having a size of μm-order which were not desired. Also, in a portion where circumferential spots were transferred, protrusions were not formed. In Comparative Example 3 that the protective layer was not provided, the optical element having good appearance and good performance could not be obtained.

EXAMPLE 4

A Ni—P plating layer with a thickness of 100 μm was formed on a SUS base and a substrate cut to the desired shape and surface accuracy was prepared. The substrate was degreased and then stains and dust present on the die surface were removed by ultrasonic cleaning. After drying, a $TiN_x$ film with a thickness of 1 μm was formed as a protective layer with a sputtering device of reactive system. Then, a Ti layer with a thickness of 50 nm was provided as an adhesive layer on the TiN, while maintaining the vacuum state, and then an aluminum layer was uniformly formed to a thickness of 500 nm by deposition on the adhesive layer to obtain a die covered with aluminum. A positive electrode was then attached to part of the surface other than that where a concave-convex structure was wished to be formed, masking was conducted, and an aluminum-covered die was obtained that was insulated and waterproofed by covering the area outside this surface. The die was then immersed together with the negative electrode in a 5 wt. % aqueous solution of phosphoric acid adjusted to a temperature of 10° C. A voltage of 120 V was then applied from a direct current power source and a current was passed for 3 min 30 sec. The hole diameter was then expanded by etching by immersing for 45 min in a 5 wt. % aqueous solution of phosphoric acid at room temperature and dissolving. The voltage application and current passing procedure was repeated four times, the etching procedure was repeated three times, and the hole diameter was then expanded by immersing for 8 min in a 5 wt. % aqueous solution of phosphoric acid at normal temperature, thereby producing tapered holes. The optical element molding die that has thus been obtained had formed therein the desired fine concave-convex structure. On the surface of the optical element molding die, generation of swelling and spots due to dissolution of the Ni layer was not observed.

The optical element molding die that has been produced by the above-described procedure was then arranged at the incoming surface side and outgoing surface side of an injection molding apparatus (SS180 manufactured by Sumitomo Heavy Industries Ltd.), poly(methyl methacrylate) (Delpet 70NH, manufactured by Asahi Chemical Co., Ltd.) was injection molded, and an optical element having a concave-convex structure was obtained. In this case, the die temperature was 95° C. and the pressure during resin injection was maintained at 80 MPa.

COMPARATIVE EXAMPLE 4

An optical element that was molded in Comparative Example 2 and had no fine concave-convex structure was produced. Table 2 below shows the results obtained by measuring the reflectance of the optical elements at an incidence angle of 5° by a spectrophotometer. the reflectance of the optical element having a fine concave-convex structure was found to be lower by about 4% than that of the optical element having no fine concave-convex structure. Also, spots and protrusive seeding having a size of μm-order were observed in an appearance.

TABLE 2

| Results Obtained in Measuring the Reflectance of Optical Elements | | | |
|---|---|---|---|
| | 450 nm | 500 nm | 550 nm |
| Fine structure is present | 0.5% | 0.2% | 0.1% |
| Fine structure is absent | 4.4% | 4.4% | 4.3% |

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-286552 filed Nov. 7, 2008, and 2009-249094 filed Oct. 29, 2009, which are hereby incorporated by reference herein in their entirety.

What is claimed is:

1. An optical element molding die, comprising:
   a substrate having Ni—P plating layer formed on a base made of stainless steel, the Ni—P plating layer being machined to a predetermined shape and surface accuracy;
   an anodic oxidation layer comprising of aluminum (Al) provided on the Ni—P plating layer; and
   a protective layer containing a material selected from a group consisting of Au, Ir, Pt, Ru, Pd, Rh, Re, Ag, Ti, Cu and Si between the Ni—P plating layer and the anodic oxidation layer.

2. The optical element molding die according to claim 1, wherein the anodic oxidation layer has a concave-convex structure composed of a plurality of holes that are open in a direction perpendicular to a surface of the anodic oxidation layer.

3. The optical element molding die according to claim 2, wherein the holes have a tapered shape such that the hole diameter decreases toward the bottom thereof.

* * * * *